(12) United States Patent
Bakis et al.

(10) Patent No.: US 6,219,639 B1
(45) Date of Patent: Apr. 17, 2001

(54) METHOD AND APPARATUS FOR RECOGNIZING IDENTITY OF INDIVIDUALS EMPLOYING SYNCHRONIZED BIOMETRICS

(75) Inventors: Raimo Bakis, Brewster; Dimitri Kanevsky, Ossining, both of NY (US); Stephane Herman Maes, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/067,829

(22) Filed: Apr. 28, 1998

(51) Int. Cl.[7] .............................. G10L 17/00; G06K 9/00
(52) U.S. Cl. ..................... 704/246; 704/249; 382/116; 382/118
(58) Field of Search .................................. 704/246, 247, 704/249, 250, 236, 241; 382/115, 116, 118, 119, 120, 121, 122, 124

(56) References Cited

U.S. PATENT DOCUMENTS

| | | | |
|---|---|---|---|
| 5,339,361 | * | 8/1994 | Schwalm et al. ................... 382/116 |
| 5,412,738 | * | 5/1995 | Brunelli et al. .................... 382/115 |
| 5,502,774 | * | 3/1996 | Bellegarda et al. ................ 382/116 |
| 5,548,660 | * | 8/1996 | Lemelson ............................ 382/116 |
| 5,621,809 | * | 4/1997 | Bellegarda et al. ................ 382/116 |
| 5,666,400 | * | 9/1997 | McAllister et al. ................ 379/88.01 |
| 5,761,329 | * | 6/1998 | Chen et al. ......................... 382/116 |
| 5,771,306 | * | 6/1998 | Stork et al. ........................ 382/100 |
| 5,862,247 | * | 6/1999 | Fisun et al. ........................ 382/116 |
| 5,913,196 | * | 6/1999 | Talmor et al. ...................... 704/270 |

OTHER PUBLICATIONS

Chen et al., "Lip Synchronization Using Speech–Assisted Video Processing," IEEE Signal Processing Letters, vol. 2, No. 4, Apr. 1995, pp. 57–59.*

* cited by examiner

Primary Examiner—David Hudspeth
Assistant Examiner—Martin Lerner
(74) Attorney, Agent, or Firm—F. Chau & Associates, LLP (57) ABSTRACT

A method for recognizing an individual based on attributes associated with the individual comprises the steps of: pre-storing at least two distinctive attributes of the individual during at least one enrollment session; contemporaneously extracting the at least two distinctive attributes from the individual during a common recognition session; segmenting the pre-stored attributes and the extracted attributes according to a sequence of segmentation units; indexing the segmented pre-stored and extracted attributes so that the segmented pre-stored and extracted attributes corresponding to an identical segmentation unit in the sequence of segmentation units are associated to an identical index; and respectively comparing the segmented pre-stored and extracted attributes associated to the identical index to each other to recognize the individual.

43 Claims, 3 Drawing Sheets

METHOD AND APPARATUS FOR RECOGNIZING IDENTITY OF INDIVIDUALS EMPLOYING SYNCHRONIZED BIOMETRICS

BACKGROUND OF THE INVENTION

1. Technical Field

The present invention relates to methods and apparatus for performing recognition (identification/verification) of individuals and, more particularly, to methods and apparatus for synchronizing biometric and/or non-biometric indicia attributable to the individuals in order to perform such recognition.

2. Discussion of Related Prior Art

In many instances it is necessary to verify that an individual requesting access to a service or a facility is in fact authorized to access the service or facility. Such services may include, for example, banking services, telephone services, credit card services, while the facilities may be, for example, banks, computer systems, or database systems. In such situations, users typically have to write down, type or key in (e.g., on a keyboard) certain information in order to send an order, make a request, obtain a service, perform a transaction or transmit a message.

Verification or authentication of a customer prior to obtaining access to such services or facilities typically relies essentially on the customer's knowledge of passwords or personal identification numbers (PINS) or by the customer interfacing with a remote operator who verifies the customer's knowledge of information such as name, address, social security number, date of birth, or mother's maiden name. In some special transactions, handwriting recognition or signature verification is also used.

However, such conventional user verification techniques present many drawbacks. First, information typically used to verify a user's identity may be easily obtained. Any perpetrator who is reasonably prepared to commit fraud usually finds it easy to obtain such personal information such as the social security number, mother's maiden name or date of birth of his intended target. Regarding security measures for more complex knowledge-based systems which require passwords, PINS or knowledge of the last transaction/ message provided during the previous service, such measures are also not reliable mainly because the user is usually unable to remember this information or because many users write the information down thus making the fraudulent perpetrator's job even easier. For instance, it is known that the many unwitting users actually write their PIN on the back of their ATM or smart card.

The shortcomings inherent with the above discussed security measures have prompted an increasing interest in biometric security technology, i.e., verifying a person's identity by personal biological characteristics. Several approaches are known, such as, for example, the recognition of voice print, facial bone structure, signature, face temperature infrared pattern, hand geometry, writing instrument velocity, writing instrument pressure, fingerprint, and retinal print, to name a few.

Of the known biometric approaches, one such approach is voice print identification (or speaker identification), which characterizes a speaker based on his or her voice. Voice print identification is based on the premise that each person can be uniquely identified by their voice. Speaker recognition (identification/verification) can be performed in text-dependent or textprompted mode (where the text of an utterance is prompted by the speech recognizer and recognition depends on the accuracy of the words uttered as compared to the prompted text), or text-independent mode (where the utterances of the speaker are used to perform recognition by comparing the acoustic characteristics of the speaker with acoustic models of previously enrolled speakers, irrespective of the words uttered). Regardless of the mode employed, speaker recognition usually involves the comparison of the utterance with a claimed speaker model. A measure of the match between the model and utterance is thereafter compared to a similar measure obtained over competing models, for instance, cohort or background models. Cohorts are composed of previously enrolled speakers who possess voice (acoustic) characteristics that are substantially similar, i.e., closest, to the speaker who tries to access the service and/or facility. Cohort models are the acoustic models built from acoustic features respectively associated with the cohort speakers. A background model is an average model built from acoustic features over the global population.

Traditionally, recognition systems employing more than one biometric recognition technique such as, for example, face and voice recognition, typically acquire and analyze each biometric feature (facial feature or voice print) sequentially and independently and merely combine the results (i.e., scores) returned by each separate recognition technique in order to obtain a combined result. However, such traditional systems do not utilize the interaction of the biometrics with respect to one another in making the identification or verification. For instance, conventional systems which independently employ face recognition and speaker recognition merely perform face recognition and speaker recognition in a mutually exclusive manner, but do not attempt to synchronize a person's lip movement with his produced speech in order to verify not only the validity of the speaker by speaker recognition, but that indeed the person interacting with the recognition system is indeed speaking the testing utterances rather than synthesizing them or playing them back from a recorder.

Thus, it would be desirable and highly advantageous to provide recognition (identification/verification) systems and methods for permitting individuals access to a service and/or facility that combine and synchronize biometric and/or non-biometric features with one another in order to provide a significant increase in the degree of accuracy of an identification or verification and thus a decrease in fraudulent and/or errant access to the service and/or facility.

SUMMARY OF THE INVENTION

It is an object of the present invention to provide methods and apparatus for recognizing (identifying/verifying) individuals that combine and synchronize biometric and/or non-biometric features with one another in order to provide a significant increase in the degree of accuracy of the recognition.

It is another object of the present invention to provide methods and apparatus for recognizing individuals that combine and synchronize biometric and/or non-biometric features with one another in order to provide a significant reduction in fraudulent and/or errant access to a service and/or facility.

In one embodiment of the present invention, a method for recognizing an individual based on attributes associated with the individual comprises the steps of: pre-storing at least two distinctive attributes of the individual during at least one enrollment session; contemporaneously extracting the at least two distinctive attributes from the individual during a common recognition session; segmenting the pre-stored attributes and the extracted attributes according to a sequence of segmentation units; indexing the segmented pre-stored and extracted attributes so that the segmented pre-stored and extracted attributes corresponding to an identical segmentation unit in the sequence of segmentation units are associated to an identical index; and respectively comparing the segmented pre-stored and extracted attributes associated to the identical index to each other to recognize the individual.

In another embodiment of the present invention, an apparatus employing synchronized speaker recognition, lip reading and lip recognition for recognizing an individual comprises: a speaker recognition system for performing speaker recognition; a lip reading system for performing lip reading; a lip recognition system for performing lip recognition; a camera and pointing system for generating images of the individual for use by the lip reading and lip recognition systems, the speaker recognition system, the lip reading system, the lip recognition system, and the camera and pointing system contemporaneously extracting biometric attributes corresponding to speaker recognition, lip reading and lip recognition; a store operatively coupled to the speaker recognition system, the lip reading system, and the lip recognition system for pre-storing biometric attributes during at least one enrollment session, the pre-stored attributes respectively corresponding to speaker recognition, lip reading and lip recognition; segmentation means for segmenting the pre-stored attributes and the extracted attributes according to a sequence of segmentation units; indexing means for indexing the segmented pre-stored and extracted attributes so that the segmented pre-stored and extracted attributes corresponding to an identical segmentation unit in the sequence of segmentation units are associated to an identical index, the speaker recognition system, the lip reading system, and the lip recognition system respectively comparing the segmented pre-stored and extracted attributes associated to the identical index to each other to recognize the individual; and a controller for processing the results of the comparisons such that the individual is considered recognized if the segmented pre-stored attributes associated to the identical index substantially match the segmented extracted attributes associated to the identical index.

In a first embodiment, the speaker recognition system is a text-independent speaker recognition system and the apparatus further comprises a labeller for clustering lefemes having comparable lip positions. Further, the lip reading system is a text-independent lip reading system and the lip reading comprises verifying if a lip shape extracted for a lefeme matches an expected lip shape of an associated cluster. In a second embodiment, the lip reading system is a text-dependent lip reading system, wherein a lip shape corresponding to a lefeme is characterized by a deviation of the geometry relative to a corresponding speaker independent lip shape. A close match of the speaker dependent shape relative to the speaker independent shape indicates a positive verification.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Synchronization of the attributes (biometric or otherwise) associated with a contemporaneous attribute extraction session is one aspect of the invention which marks a difference with the conventional combined recognition technique systems which merely combine the scores of the individual mutually exclusive techniques but do not attempt to check the synchronization of the attributes extracted by each technique. The term "synchronize" as applied herein to multiple attributes means to segment (sample) the multiple attributes according to a sequence of segmentation units and then index (label) the segmented attributes so that the segmented attributes corresponding to an identical segmentation unit in the sequence of segmentation units are associated to an identical index. For example, consider that an individual speaks the word "open" during a time interval from $t_0$ to $t_n$ of a recognition session. The utterance and his corresponding lip shape are sampled (segmented) at a rate of 10 ms and are labeled (indexed) by time frame (e.g., $t_0$, $t_1$, $t_2$, . . . ). The segmented and indexed portions of the utterance and lip shape corresponding to time frame $t_1$ are associated to each other in that they occurred during the same time frame ($t_1$). Thus, for example, if time frame $t_1$ corresponds to the voice sound "o", then the lip shape associated with time frame $t_1$ must correspond to an open mouth shape. Conventional recognition systems employing speech and lip shape recognition individually compare each extracted attribute to corresponding previously stored data and combine the scores of the individual mutually exclusive techniques in order to recognize the individual. On the other hand, the present invention synchronizes the attributes and compares the synchronized attributes in order to provide a greater degree of accuracy in the recognition process. For example, not only are the voice sounds and lip shapes individually compared to corresponding previously stored data of the speaker, but the synchronization of the two attributes is also compared so that it can be confirmed that indeed the utterance provided to the speaker recognition system matches the behavior of the lips of the speaker.

Figure 1:
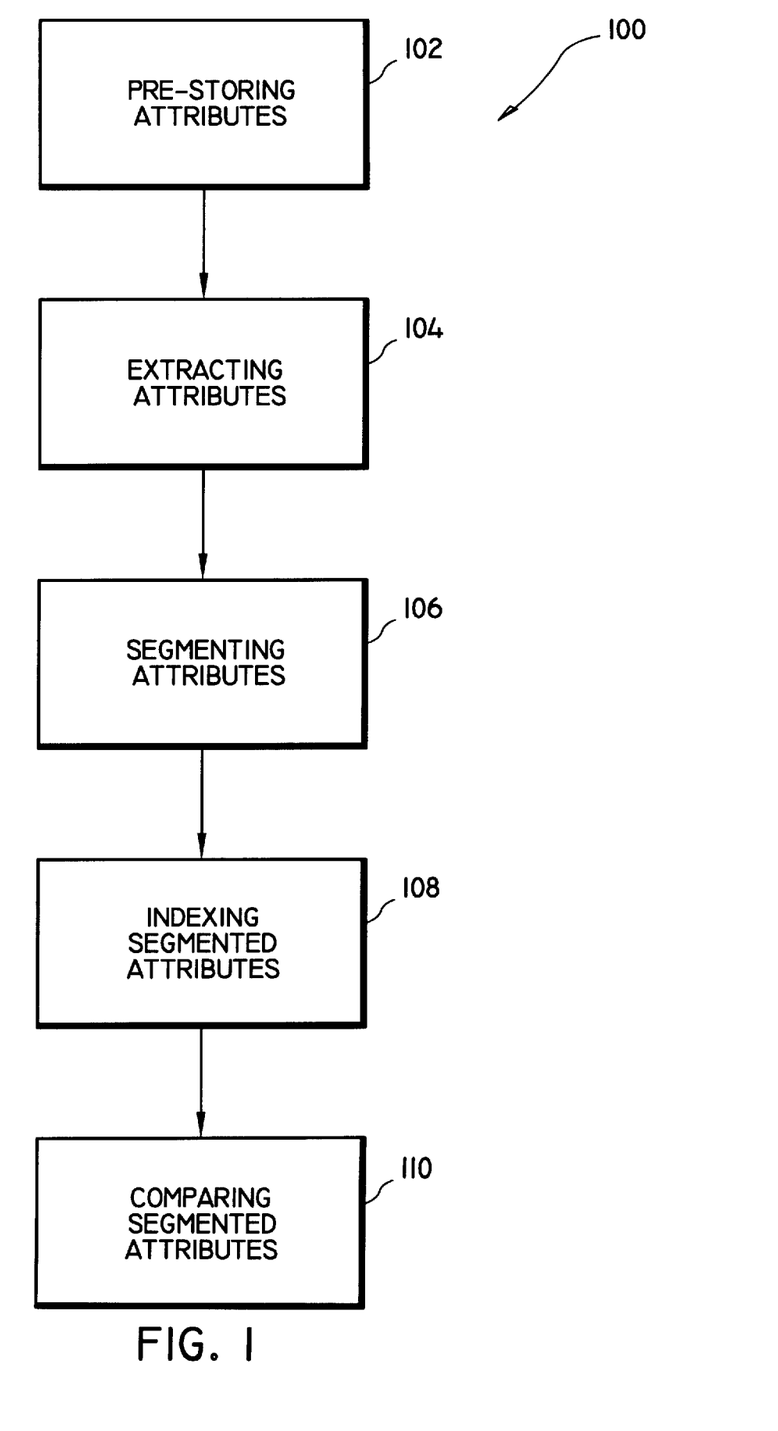
FIG. 1 is a flow chart of a method for recognizing an individual based on attributes associated with the individual according to an embodiment of the present invention.

Given the broad overview thus provided of the present invention, a flow chart of a method 100 for recognizing an individual based on attributes associated with the individual according to an embodiment of the present invention is provided in FIG. 1. The method 100 includes the step of pre-storing two or more distinctive attributes of the individual during at least one enrollment session (step 102). Then, the two or more distinctive attributes are contemporaneously extracted from the individual during a common recognition session (step 104). The pre-stored attributes and the extracted attributes are segmented according to a sequence of segmentation units (step 106). The segmented pre-stored and extracted attributes are indexed so that the segmented pre-stored and extracted attributes corresponding to an identical segmentation unit in the sequence of segmentation units are associated to an identical index (step 108). Finally, the segmented pre-stored and extracted attributes associated to the identical index are respectively compared to each other to recognize the individual (step 110).

Thus, as another example, consider that during a recognition session wherein an individual provides a sample of his signature, the pressure and velocity patterns of the pen used to generate his signature as well as the hand geometry pattern around the pen itself may be contemporaneously extracted from the individual. Also consider that these patterns have been previously extracted and stored during an enrollment session. It is to be appreciated that as the individual is signing different portions of different letters of the alphabet (e.g., arcs, straight lines, etc.), his hand geometry will change as well as the pressure and velocity of the pen he is utilizing to generate his signature. Thus, according to an embodiment of the present invention, the pre-stored attributes and the later extracted attributes are segmented (sampled) at a rate of 5 ms and are indexed (labeled) by time frame (e.g., $t_0$, $t_1$, $t_2$, . . . ). The segmented and indexed portions of the handwriting geometry and pen pressure and velocity patterns corresponding to time frame $t_1$ are associated to each other in that they occurred during the same time frame ($t_1$). The segmented pre-stored and the later extracted attributes associated to the identical index are respectively compared to each other to recognize the individual. The individual is considered recognized if, for a given time frame(s) such as $t_1$, the segmented pre-stored handwriting, pen pressure and velocity patterns all match the segmented later extracted handwriting, pen pressure and velocity patterns. Thus, a frauder intending to forge the signature would not only have to be proficient at duplicating the signature of the person whose signature is to be forged, but would also have to have a similar sized hand that contorts in the same way when generating the signature as well as similar pressure and velocity patterns. These attributes can be segmented to the level where they can be synchronized for portions of individual letters of the alphabet (or single letters or groups of letters). It is quite apparent that the attribute synchronizing technique of the present invention provides a significant improvement in the accuracy of the recognition when compared to conventional multiple recognition technique systems that operate sequentially and exclusively. It is to be understood that the present invention is not limited to the synchronization of biometric techniques only, but rather, the present invention may be generalized to any combination of biometric techniques and/or non-biometric techniques where the collection of the biometric and/or non-biometric features of one technique is synchronized with another set of features contemporaneously obtained from the other technique.

Given the teachings herein, one of ordinary skill in the art will appreciate that practical implementations of the present invention are many and varied in nature. However, in accordance with the requirement to present a preferred mode of implementing such inventive concepts, the following detailed description presents preferred methods and systems for implementing the present invention in the context of a dynamic combination of speaker recognition techniques, lip reading techniques and lip recognition techniques.

The use of speaker recognition to selectively permit access to a service or facility is known in the art. However, when speaker recognition alone is performed, regardless of the technique employed, it is often uncertain if the speaker is actually speaking or merely playing back a voice recording of someone authorized to access. In a preferred embodiment, systems and methods are provided which permit confirmation that indeed the utterance provided to the speaker recognition system matches the behavior of the lips of the speaker and further, that the speaker's lip shape matches a previously extracted and stored lip shape of the speaker on file. Thus, individuals actually speaking the words provided to the speaker recognition system may be discerned from individuals merely utilizing voice recordings, as well as individuals able to proficiently synchronize their lip movements with a pre-recorded voice (i.e., lip syncing).

The aforementioned advantages are obtained by preferably observing the motion of the lips when the individual is speaking (i.e., dynamic lip geometry) as well as the overall lip region during a period(s) of silence (i.e., static lip geometry) to verify if they match the characteristics of the individual. The verification of both static characteristics (geometrical characteristics, such as, for example, when the lips are closed) and dynamic characteristics (geometry associated with different classes of lefemes (i.e., portions of phones in a given context) or rates of change from one geometry to the other) provides an additional and significant measure of verification/identification of the subject individual over single mode systems.

Figure 2:
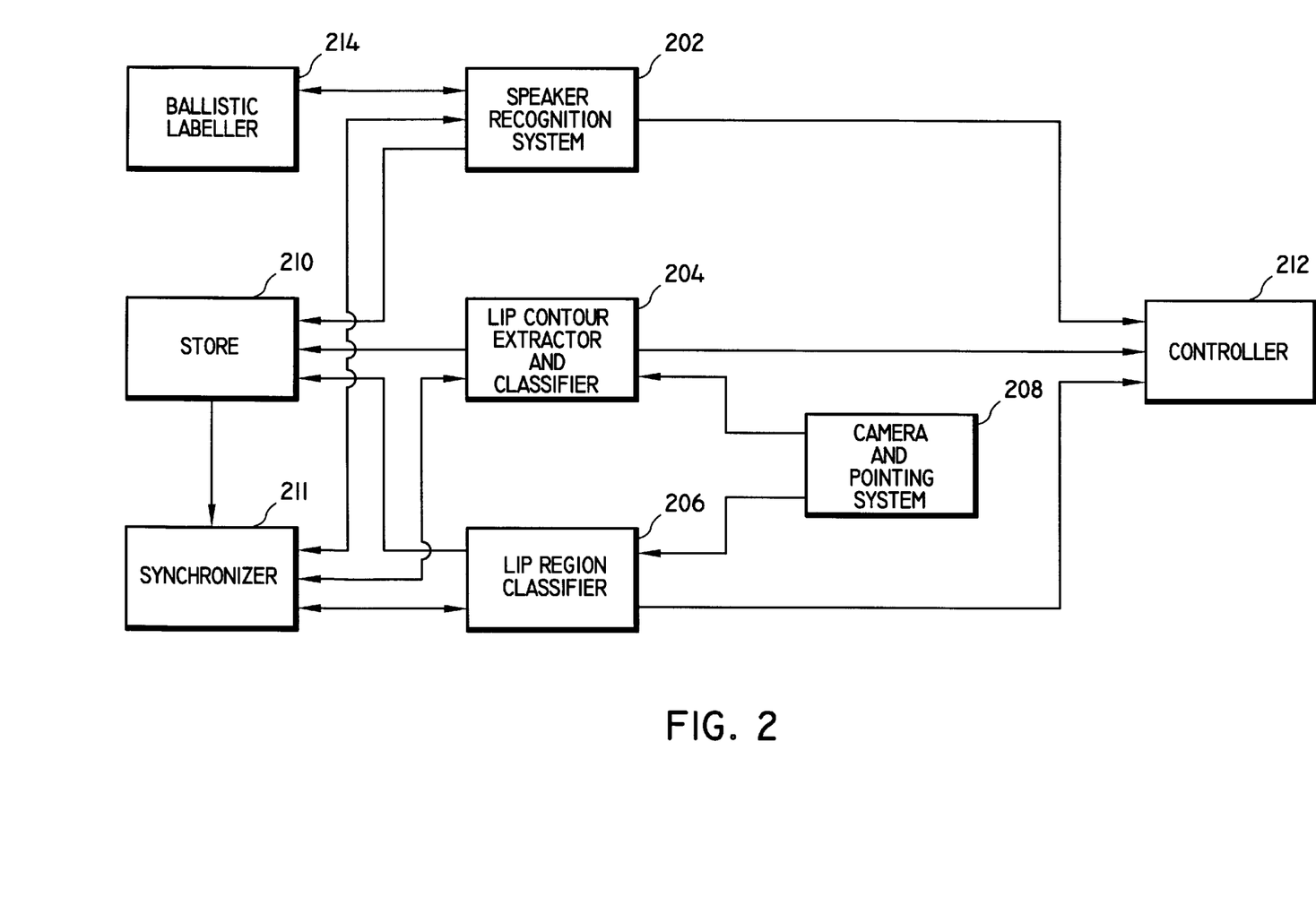
FIG. 2 is a block diagram of an apparatus employing synchronized speaker recognition, lip reading and lip recognition for recognizing an individual according to an embodiment of the invention.

Referring now to FIG. 2, there is shown a block diagram of an apparatus 200 employing synchronized speaker recognition, lip reading and lip recognition for recognizing an individual according to a preferred embodiment of the invention. It is to be appreciated that the illustrative apparatus provides a dynamic combination of speaker recognition techniques, lip reading techniques and lip recognition techniques. It is to be further appreciated that the elements illustrated in FIG. 2 may be implemented in various forms of hardware, software, or combinations thereof. In the case of elements implemented in software, such implementations may be on one or more appropriately programmed general purpose digital computers, each having a processor, associated memory and input/output interfaces for executing the elements of the invention. Of course, special purpose processors may be employed to implement the invention. Given the teachings of the invention provided herein, one of ordinary skill in the related art will be able to contemplate these and similar implementations of the elements of the invention. The apparatus 200 includes: a speaker recognition system 202; a lip contour extractor and classifier 204; a lip region classifier 206; a camera and pointing system 208 operatively coupled to the lip contour extractor and classifier 204 and the lip region classifier 206; a store 210 operatively coupled to the speaker recognition system 202, the lip contour extractor and classifier 204, and the lip region classifier 206; a synchronizer 211 operatively coupled to the speaker recognition system 202, the lip contour extractor and classifier 204, and the lip region classifier 206; and a controller 212 operatively coupled to the speaker recognition system 202, the lip contour extractor and classifier 204, and the lip region classifier 206.

In selecting the speaker recognition system 202, any type of such system may be utilized. Preferably, the speaker recognition system employed in accordance with the present invention is a system which performs text-independent speaker verification and asks random questions, as disclosed in U.S. Pat. No. 5,897,616, filed on Jun. 11, 1997, and entitled "Apparatus and Methods for Speaker Verification/Identification/Classifying Employing Non-Acoustic and/or Acoustic Models and Databases", the disclosure of which is incorporated by reference herein. In one embodiment of such a speaker recognition system, users of a service/facility are previously enrolled such that acoustic models of their voice characteristics are generated and stored in an acoustic database. Furthermore, non-acoustic information (specific to each user) is generated and stored in a non-acoustic database. On a subsequent occasion when a user requests access, he is queried with a random question (or multiple random questions). Based on a comparison of his utterances at that time with the previously stored acoustic and non-acoustic information (i.e., the answer(s) to the random question), the user is denied or granted access. That is, the user is granted access if both his voice characteristics and the answer to the random question substantially match the acoustic and non-acoustic information stored in the databases. The resulting system is a combination of technology: text-independent speaker recognition, speech recognition and natural language understanding.

More particularly, the text-independent speaker recognition system is preferably based on a frame-by-frame feature classification as disclosed in detail in U.S. Ser. No. 08/788,471 filed on Jan. 28, 1997 and entitled "Text Independent Speaker Recognition for Transparent Command Ambiguity Resolution and Continuous Access Control," the disclosure of which is also incorporate by reference herein. As explained in the above-incorporated reference, U.S. Ser. No. 08/788,471, text-independent speaker recognition is preferred over text-dependent or text-prompted speaker recognition because text independence allows the speaker recognition function to be carried out in parallel with other speech recognition-based functions in a manner transparent to a user and for a plurality of concurrent users at differing access levels without requiring interruption for new commands or identification of a system user whenever a new user is encountered. However, while the aforementioned embodiments of speaker recognition systems are preferred, it is to be understood that the present invention is usable with any speaker recognition system and is not, in any way, limited to use with or dependent on any details or methodologies of any particular speaker recognition arrangement with which the invention may be employed.

The second element of apparatus 200, the lip contour extractor and classifier 204, is utilized to extract and classify the lip contour geometry of the individual while the individual is speaking (i.e., lip reading). Thus, this system is utilized to extract dynamic characteristics of the speaker (e.g., the lip shape extracted for a lefeme matches the expected lip shape). It is to be appreciated that the present invention is usable with any lip contour extractor and classifier and is not, in any way, limited to use with or dependent on any details or methodologies of any particular lip contour extractor and classifier arrangement with which the invention may be employed. Preferably, the system employed in accordance with the present invention is a system in which edges are extracted from an image (generated by camera and pointing system 208, as will be explained hereinbelow) using a one level sub-band coder (as described in "Wavelet Maxima Representation", by S. Mallat and S. Zhong, pp. 207–266, Meyer Y. Ed., Wavelets and Applications, Springer Verlag, 1991), followed by decoding and reconstruction of the image with no low frequency band. Edge images are preferred when it is important to avoid the influence of the facial hairs. Three pairs of parabolas are optimally matched to an image by maximum likelihood. The likelihood is modeled by mixtures of Gaussians fit on the edge images. Initial guesses of the location of the mouth are obtained based on the normally expected position of the eyes and mouth, with possible positions highly constrained. Once extracted, these parameters are normalized (e.g. same mouth width). A reference for real-time lip tracking is disclosed in the article by Andrew Blake et al., "Real-Time Lip Tracking for Audio-Visual Speech Recognition Applications," Proc. European Conf. Computer Vision, pp. 376–87, Cambridge, U.K., 1966. Additionally, the following references are provided: Karin Sobottka and Ioannis Pitas, "A Fully Automatic Approach to Facial Feature Detection and Tracking", Audio and Video Based Biometric Person Authentication, pp. 77–84, Springer, 1997; and G. Borgefors et al., "Analysis and Encoding of Lip Movements", Audio and Video Based Biometric Person Authentication, pp. 53–60, Springer, 1997.

The third element, a lip region classifier 206, is utilized to perform a match of the speaker's lip region, typically, during a silence period (i.e., at a moment when the individual is not speaking). This system classifies, for example, the parameters associated with the mouth parabolas. This classification, as well as a face recognition (the whole face or a region around the mouth) can be performed utilizing a wide variety of methods (see K. Etemad and Rama Chellappa, "Discriminant Analysis for Recognition of Human Face Images", Audio and Video Based Biometric Person Authentication, pp. 127–142, 1997). For example, the pixel value or the DCT (discrete cosine transform) of a region around the mouth, or of the whole face (in the image or in the edge image as mentioned above), can be classified using classical classifiers like vector quantization or neural network (see Y. Dai and Y. Nakano, "Recognition of Facial Images with Low Resolution Using a Hopfield Memory Model", Audio and Video Based Biometric Person Authentication, pp. 153–160, 1997). A reference for extracting shapes from a human face is disclosed in the article by T. Kunii et al., "Extraction of 3D shapes from the Moving Human Face Using Lighting Switch Photometry", Creating and Animating the Virtual Worlds, pp. 69–86, Springer, Tokyo, 1993. Additionally, the following reference explains how biometric verification can also be performed using lip shape characteristics and face characteristics: J. Kittler et al., "Lip-Shape Dependent Face Verification", Audio and Video Based Biometric Person Authentication, pp. 61–68, Springer, 1997.

The fourth element of apparatus 200, the camera and pointing system 208, is utilized to capture images of the individual for use by the lip contour extractor and classifier 204 and the lip region classifier, and may be similar to such systems utilized in face recognition systems. The camera may be of the auto-focus variety or may be focused for a given region. In the latter case, the speaker will be advised to position his head appropriately. The verification of the head position can be easily performed by extracting the contours of the head and checking its position relative to reference contours.

The fifth element, the store 210, is utilized to pre-store previously extracted biometric attributes which may be later retrieved for the purpose of comparison with subsequently extracted biometric attributes to determine if a match exists between the previously and subsequently extracted attributes (i.e., to identify the individual furnishing the attributes). Any type of storage means is contemplated for implementation with the present invention. Preferably, the store 210 employed in accordance with the present invention is the apparatus that allows repetitive enrollment by a user to different systems which utilize biometric recognition based on a single individual personal enrollment, as disclosed in the patent application (IBM Docket No. Y0997-313) entitled "Apparatus and Methods for Providing Repetitive Enrollment in a Plurality of Biometric Recognition Systems Based on an Initial Enrollment", the disclosure of which is incorporated by reference herein. This application describes an apparatus for providing biometric information (as well as non-biometric information) in an accessible medium so that the biometric information need be provided only once by the user, yet may be used by multiple biometric verification/identification systems for subsequent enrollment (e.g., providing a biometric attribute sample) and registration (e.g., obtaining the status of an authorized user upon successful verification/identification). The apparatus includes an extractor for extracting a biometric attribute from a user. Further, a server is included, operatively coupled to the extractor, for interfacing with a plurality of biometric recognition systems to receive requests for biometric attributes therefrom and transmit biometric attributes thereto. The server has a memory device for storing the biometric attribute. In one embodiment in which the server is integrated with the internet, a user simply provides a server address, a login, a password, and a public decryption key in order to facilitate access to the previously stored biometric attributes by the plurality of biometric recognition systems.

The sixth element, the synchronizer 211, is utilized to synchronize various multiple attributes (biometric and/or non-biometric) of an individual so that the synchronized attributes may be respectively compared. The synchronizer 211 synchronizes both previously extracted and stored attributes (corresponding to one or more enrollment sessions) as well as the attributes extracted during the recognition session. The synchronizer 211 segments (samples) the pre-stored and the later extracted attributes according to a sequence of segmentation units and then indexes (labels) the segmented attributes so that the segmented attributes corresponding to an identical segmentation unit in the sequence of segmentation units are associated to an identical index. In this way, the segmented pre-stored and the later extracted attributes associated to the identical index are respectively compared to each other to recognize the individual. The individual is considered recognized if, for a given time frame(s) such as $t_1$, the segmented pre-stored acoustic data and lip shape all match the segmented later extracted acoustic data and lip shape.

It is to be appreciated that for certain attributes, the acts of segmenting and indexing may be performed by their corresponding recognition system. For example, a speech recognizer may, among other things, act as a synchronizer with respect to voice sounds. That is, it will segment utterances and index phonemes to time intervals. However, in other cases, a module for segmenting and indexing may be separately required. In either case, recognition of an individual according to the present invention requires synchronizing both the pre-stored and the later extracted attributes of the individual and respectively comparing the synchronized pre-stored and later extracted attributes. Thus, in the first case, where one of the recognition systems incorporates the acts of segmenting and indexing, the remaining recognition systems must be operatively coupled to the recognition system performing the segmenting and indexing so that the attributes corresponding to the remaining recognition systems can be similarly segmented and indexed (i.e., all attributes are segmented according to a sequence of segmentation units and then the segmented attributes are indexed so that the segmented attributes corresponding to an identical segmentation unit in the sequence of segmentation units are associated to an identical index).

It is to be further appreciated that the comparisons of the pre-stored attributes (corresponding to the enrollment session) to the later extracted attributes (corresponding to the recognition session) are performed by the respective recognition systems. However, unlike conventional recognition systems employing multiple but sequential and mutually exclusive recognition techniques, the act of comparing according to the present invention involves respectively comparing all the segmented pre-stored attributes corresponding to an identical segmentation unit in the sequence of segmentation units to all the later extracted attributes corresponding to the same segmentation unit.

Thus, for example, if an individual speaks the word "open" during a recognition session, the speaker recognition system 202 should detect a voice sound "o" at some time interval and the lip contour extractor and classifier 204 should detect parameters that characterize an open, relatively round mouth at the same time interval. The voice sound "o" and the open, relatively round mouth corresponding to the same time frame of the recognition session are respectively compared to the voice sound and mouth shape corresponding to the same time frame of an enrollment session where the individual also spoke the word "open". At time frames $t_1$ of both the enrollment and recognition sessions, the voice sound should correspond to the sound "o" and the lip shape should correspond to an open, relatively round mouth. In this way, an imposter utilizing a tape recorder to reproduce a password (i.e., "open") during the recognition phase of a recognition session can be detected. The imposter would not only have to simulate the voice characteristics of a legitimate individual, but would also have to simultaneously perform proficient lip syncing. Combining additional attributes such as, for example, knowledge of personal information during the acquisition of voice characteristics in the above example, would make it significantly difficult for the imposter to successfully impersonate the legitimate individual. Other examples of the use of this technique are given in an algorithm disclosed hereinbelow. The algorithm facilitates the synchronization of different biometric (and/or non-biometric) attributes and is performed by synchronizer 211. As mentioned, the synchronizer may be implemented as part of an appropriately programmed (digital) computer such that the processor executes the steps of the algorithm or modules, once loaded into the processor's associated memory, as is known.

The basic idea of the algorithm follows. A speaker verification is performed via a combined (audio-video) speaker verification model. Then, the video model is excluded from the combined model and parameters of the audio model are adjusted in such a way as to match a verification procedure of the combined audio video model. This produces better speaker audio models.

Then, the audio model is excluded from the combined speaker verification model and parameters of the video model are adjusted in such a way as to match a verification procedure of the combined model. Next, a new combined verification model is constructed having components of the adjusted audio and video models. This procedure is iteratively continued until it stabilizes.

The procedure can be applied to speech and lip-reading data produced either over large time periods (e.g., corresponding to whole spoken words and phrases) or over small time periods (e.g., corresponding to spoken phonemes or fractions of phonemes). If the method is applied over small time periods, the synchronization of biometric (and/or non-biometric) attributes from varying sources can be exploited. If the attributes are not synchronized, performing the procedure of excluding one source of information from another source would not lead to an improved match based on the combined attribute sources (i.e., voice and video). This is illustrated in FIG. 3, corresponding to an example of a recognition procedure in which a user is required to correctly speak a password phrase (consisting of several words).

Figure 3:
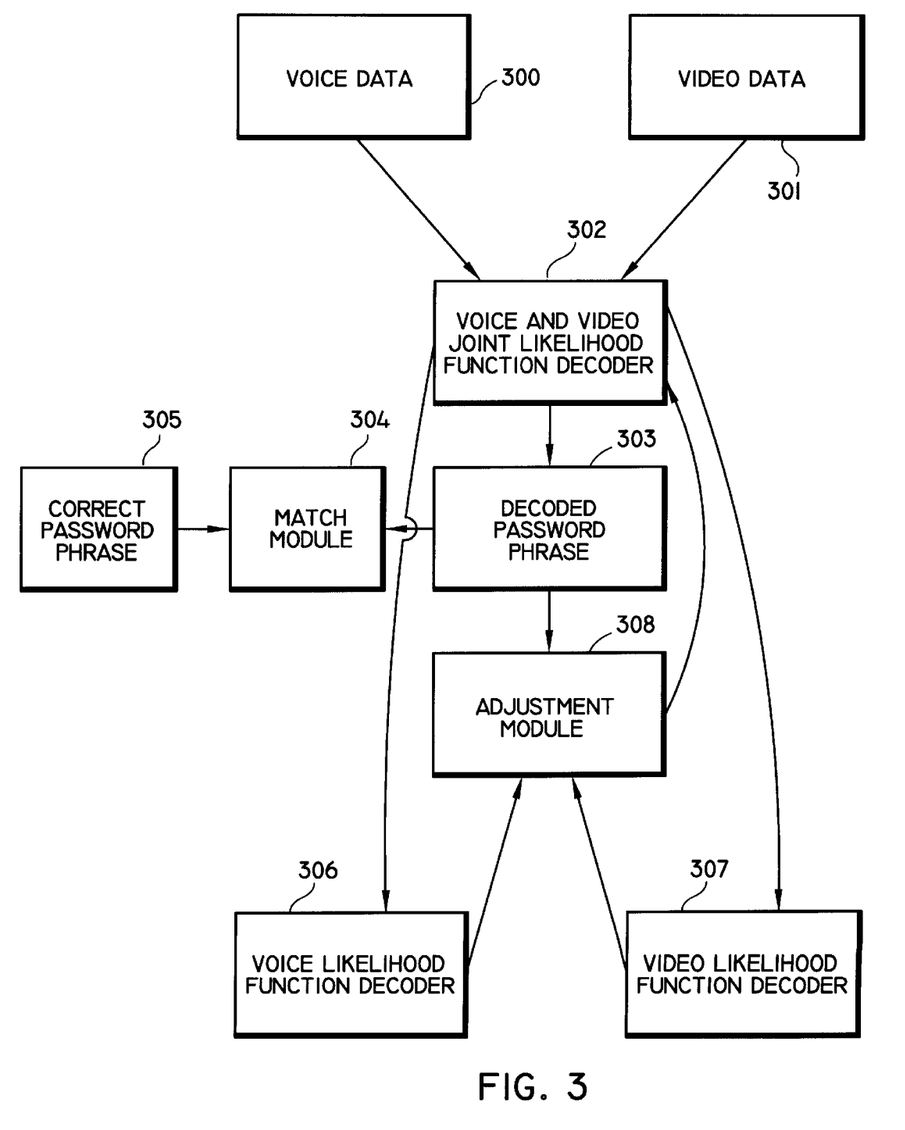
FIG. 3 is a block diagram illustrating an example of a user authentication according to an embodiment of the present invention.

Referring to FIG. 3, voice data 300 and video data 301 (from store 210, speaker recognition system 202, lip contour extractor and classifier 204, and lip region classifier 206) are input to a voice and video joint likelihood function decoder 302 which outputs a decoded password phrase 303. The joint likelihood decoder 302 is operatively coupled to voice and video likelihood function decoders 306 and 307, respectively, and to an adjustment module 308. The voice and video decoders 306 and 307, respectively, are also operatively coupled to adjustment module 308. The decoded password phrase 303 and a correct password phrase 305 are input to a match module 304.

Voice data 300 and video data (e.g., lip contour data) 301 are processed by voice and video joint likelihood function decoder 302, which applies joint likelihood functions to synchronized utterances of the voice and video data. Decoding via joint likelihood function decoder 302 produces a decoded password phrase 303 that may fully coincide with the correct password phrase 305 or may differ by one or a few words (phonemes). The joint likelihood function decoder 302 utilizes a combination of likelihood functions for voice and video components provided by voice likelihood function decoder 306 and video likelihood function decoder 307. The voice likelihood function decoder 306 is adjusted (via adjustment module 308) to produce a decoded password phrase 303 by comparing the decoded password phrase 303 obtained via voice and video joint likelihood function decoder 302 to both decoded components (i.e., voice and video) provided by voice likelihood function decoder 306 and video likelihood function decoder 307 from the previous iteration. This adjustment is performed via modification of some parameters in the voice likelihood function decoder 306. The voice likelihood function decoder 306 is adjusted to produce a better match to the decoded phrase 303. Thus, the adjustment is performed to provide a better match to the decoded phrase 303 based on adjustment of one of the two components, i.e., the voice component.

Then, similarly, video likelihood function decoder 307 is adjusted (via adjustment module 308) to produce a decoded password phrase 303 by comparing the decoded password phrase 303 obtained via voice and video joint likelihood function decoder 302 to both decoded components (i.e., voice and video) provided by voice likelihood function decoder 306 and video likelihood function decoder 307 from the previous iteration. The video likelihood function decoder 307 is adjusted to produce a better match to the decoded phrase 303. The idea is that through the improvement of one component, a subsequent decoding based on both components should provide a better match than a previous decoding based on both components. Thus, the adjusted likelihood components are combined together via joint likelihood function 302 and a new decoded password phrase 303 is produced. This process continues until a full match between the decoded password phrase and the correct password phrase 305 is established via match module 304. If this process deteriorates (i.e., the match is not improving and not stabilizing) then that means that either the data sources are not synchronized or that the data has been furnished by an imposter.

The process of adjusting the voice and video likelihood decoders 306 and 307 via the decoded password phrases continues over several iterative steps. After each step, when both decoded components are used, a comparison can be made by match module 304 between the latest decoded password phrase 303 and the correct password phrase 305. There can be several possibilities during this match. First, the decoded password phrase 303 fully matches the correct password phrase 305. In this case, a user is deemed recognized (i.e., authentic). Second, the decoded password phrase 303 may not fully match the correct password phrase 305 and this match varies and/or degrades with different steps (i.e., for new steps different words in the decoded password phrase 303 do not match the correct password phrase 305 and/or the number of misrecognized words is increasing). In this case, the user's authenticity is not confirmed. Third, there can be a middle case where the decoded phrase is stabilized (i.e., each step produces the same decoded phrase) but differs slightly from the correct password phrase. In this case, additional methods or data can be utilized to verify identify (such as, for example, verifying the answers to randomly asked questions).

The detailed description of this approach in mathematical terms is given hereinbelow. Let $V\_j$ be a j-th speaker voice model consisting of a set of parameters $\{v\_ji\}$ and $L\_j$ be a j-th speaker lip-reading model consisting of a set of parameters $\{l\_ji\}$, $(j=1, 2, 3, \ldots, N)$. Assume that a combined voice-lipreading verification model involves some function $F=F(\Lambda,V\_j,L\_j,T)$ of weighting parameters $\Lambda=\{\lambda\_k\}$, voice and lip-reading model parameters $(V\_j, L\_j)$, and an input (audio-video) utterance $T=\{a\_1, \ldots, a\_k; f\_1, \ldots, f\_r\}$. Examples of combined joint likelihood functions for multiple sources of information are described in U.S. Pat. No. 5,502,774, entitled "Automatic Recognition of a Consistent Message Using Multiple Complimentary Sources of Information", filed on Mar. 26, 1996, the disclosure of which is incorporated herein by reference.

Assume that a person whose identity is verified is required to speak a predetermined phrase consisting of several words ("passphrase"). Assume that a reference verification procedure for a speaker involves the following steps. First, an utterance consisting of acoustic and video frames T is decoded using each of pairs of models $(V\_j, L\_j)$, $(j=1, 2, 3, \ldots, N)$. This step produces a decoded phrase $P\_j$ for each combined speaker model $(j=1, 2, 3, \ldots, N)$. Then, each decoded phrase $P\_j$ $(j=1, 2, 3, \ldots, N)$ is matched to a passphrase P and a speaker with the best match is identified.

A new improved verification procedure is schematically described hereinbelow (for each $j=1, \ldots N$). First, decode an utterance consisting of acoustic and video frames T using each of pairs of models $(V\_j, L\_j)$, $(j=1, 2, 3, \ldots, N)$. As described above, this step produces a decoded phrase $P\_j$ for each combined speaker model $(j=1, 2, 3, \ldots, N)$. Then, change weighting parameters $\Lambda$ to $\Lambda V$ in such a way as to reduce the effect of a lip-reading model on a combined score F. For example, if F is a weighted sum of voice and lip-reading likelihood scores wherein $F=\lambda\_1*S1(V\_j)+\lambda\_2*S2(L\_j)$, set $\lambda\_1$ and $\lambda\_2$ to 1 and 0, respectively. Consequently, adjust parameters in $V\_j$ to $VV\_j$ in such a way that decoding via a score $F(\Lambda V, VV\_j)$ produces a better match to a decoded phrase $P\_j$ than decoding via a score $F(\Lambda,V\_j)$.

Similarly, change weighting parameters $\Lambda$ to $\Lambda L$ in such a way as to reduce the effect of a voice model on a combined score F. For example, if F is a weighted sum of voice and lip-reading likelihood scores wherein $F=\lambda\_1*S1(V\_j)+\lambda\_2*S2(L\_j)$, set $\lambda\_1$ and $\lambda\_2$ to 0 and 1, respectively. Then, adjust parameters in $L\_j$ to $LL\_j$ in such a way that decoding via a score $F(\Lambda L, LL\_j)$ produces a better match to a decoded phrase $P\_j$ than decoding via a score $F(\Lambda,L\_j)$. Next, decode an utterance consisting of acoustic and video frames T using each of pairs of models $(VV\_j, LL\_j)$, $j=1, \ldots N$, and $\Lambda$ parameters. This results in a new decoded phrase $PC\_j$ for each combined speaker model $(j=1, 2, 3, \ldots, N)$.

Consequently, continue as before in changing $\Lambda$ to $\Lambda V$ and $\Lambda L$, until new decoded phrases are stabilized (i.e., they do not changed with a new iteration). This give rise to a "stabilized" set of parameters VV and LL. Accordingly, perform the reference speaker verification with the stabilized set of parameters. It is to be noted that if models V and L are HMM based, then adjustment of the parameters to a new decoding phrase can be done via alignment of an input utterance to the new decoded phrase and forward-backward iterations for the HMMs.

An example of how the algorithm can be implemented for lip-contour and mouth region biometrics is provided hereinbelow. In the algorithm, an assumption is made that a video likelihood function L for each speaker is a weighted sum of likelihood functions for lip-contour L__c and mouth region L__m, wherein L=α*L__c+β*L__m (where α and β are weighed coefficients). Another assumption is made that a total likelihood function that involves voice score V (for each speaker) and audio score L is a sum of these scores (i.e., V+L). In practice, more complex expressions can be involved and, thus, the sum of scores V and L is provided as simply one example.

Using the expression V+L, a password phrase W1 (set Wn, where n=1, 2, 3, . . . , Wn; where Wi are words and phonemes) can be decoded. This decoding phrase is produced using given audio and video utterances that the speaker furnished when he or she spoke a phrase. It is assumed that the speaker's utterances fit a time interval T1–Tk. Then, exclude voice related component (V) and consider only the video component L. An audio utterance can be decoded using only the video component L, resulting in a phrase R1 (set Rn, where n=1, 2, 3, . . . , Rn). This phrase (R1) should presumably contain more errors than decoded passphrase W1 that was obtained from both the audio and video sources.

However, parameters α and β in likelihood function L can be tuned to determine a combination of α and β that results in the best match of decoded phrase R1 to decoded phrase W1. After choosing the parameters α and β that result in the best match of R1 to W1, a combined function V+L' can be considered, where L' is a mixture of L__c and L__m with the new α and β.

This new mixture can be used to decode an audio and video utterance and produce a new decoded password phrase W'. This new decoded password phrase may have a better match with a reference password phrase if a model of a correct speaker is utilized and the biometrics sources are synchronized. This procedure can be done for sub-intervals of time periods (while checking the synchronization of phonemes and smaller sub-units of biometrics patterns). Further, this procedure can be repeated iteratively (by dropping the video component and considering a mixture of scores for audio biometrics).

Returning to the description of the apparatus of FIG. 2, the seventh element of apparatus 200, the controller 212, processes the results of the speaker recognition system 202, the lip contour extractor and classifier 204, and the lip region classifier 206. According to the illustrative embodiment of the invention, an individual is considered recognized if the results of the speaker recognition, lip reading, and lip recognition are all positive (i.e., the segmented pre-stored attributes associated to the identical index substantially match the segmented extracted attributes associated to the identical index). A positive recognition is based on the all three recognition techniques so as to discern individuals actually speaking the words provided to the speaker recognition system from individuals merely utilizing voice recordings, as well as individuals proficient at lip syncing. This is a significant difference over prior art systems employing multiple recognition techniques that operate in a sequential and mutually exclusive manner.

In the illustrative embodiment of FIG. 2, besides classical speaker recognition, the acoustic utterances are labeled in real time with a ballistic labeller 214 which produces a sequence of lefemes (i.e., portions of phones in a given context) that are aligned with the utterances. The lefemes are utilized by the speaker recognition system to correctly decode the utterances. The ballistic labeller 214 is also utilized to cluster lefemes that have similar lip positions.

The use of a ballistic labeller is described U.S. Ser. No. 09/015,150, entitled "Apparatus and Method for Generating Phonetic Transcriptions from Enrollment Utterances", which was filed on Jan. 29, 1998, the disclosure of which is incorporated by reference herein. This application describes a system for generating acoustic representations (baseforms) from acoustic utterances in terms of speaker independent sub-word acoustic units (phones), in order to build a personalized vocabulary. The system includes a feature extractor for extracting feature vectors from the acoustic utterance for each frame of the utterance, as is known. The ballistic labeller, operatively connected to the feature extractor, is utilized to construct a trellis of nodes, the trellis having a forward and a backward direction associated therewith, a first node corresponding to a first frame of the utterance, a last node corresponding to the last frame of the utterance, and other nodes therebetween corresponding to frames of the utterance other than the first and the last frame. The ballistic labeller indexes each frame of the utterance, starting from the first frame and ending at the last frame, to find the most likely predecessor of each node in the backward direction. A backtracking module, operatively coupled to the ballistic labeller, is utilized for backtracking through the trellis starting from the last frame and ending at the first frame to generate the phonetic transcription. The baseforms are utilized by a speech recognition system to correctly decode the utterances.

In the present invention, the ballistic labeller 214 is utilized to construct a trellis of lefeme nodes. From the trellis, a sequence of lefemes corresponding to the baseform of each utterance is generated. For each lefeme of the sequence, the time marks corresponding to each frame of speech are extracted and the corresponding real-time lip contour geometry is compared with the reference lip contour geometry in the store 210 (Mahalanobis distance between the geometrical parameters). A matching measure (score) is computed over the whole utterance by controller 212. At the beginning, the end or during periods of silence, the lip region is matched with the data in the store 210, to perform a lip region verification.

If the answers to the random questions, and the results of the speaker verification, the lip recognition and the lip reading are all acceptable (e.g., the combined score is above a predefined threshold), the identification/verification is considered positive. Otherwise, the individual is not considered to be identified/verified (i.e., rejected). Since verification is required to permit access to a service/facility, an individual who is not verified is not permitted access. Alternatively, additional procedures may be implemented to further perform identification/verification of the individual in the case that the individual is not initially identified/verified. For example, additional biometric and/or non-biometric recognition techniques may be implemented. Alternatively, an indication may be initiated from the controller 212 to an integrated security system that a potential breach has occurred.

It is to be appreciated that by repeating the lip contour extraction and lefeme alignment over a large population, it is possible to classify the lefemes which have comparable lip positions to, typically, about 12 clusters. In speaker-independent lip reading systems, we will only verify if the each lip shape extracted for a lefeme matches the expected lip shape of the associated cluster. Accordingly, in such a reading system, the ballistic labeller 214 is utilized to cluster the lefemes that have similar lip geometries (e.g., round shape, closed, etc.).

In speaker-dependent lip reading, the shape associated to each cluster of lefemes has been extracted during enrollment of the speaker. Accordingly, the lip shape corresponding to a lefeme is characterized by deviation of the geometry relative to the speaker independent shape. A close match of the speaker dependent shape relative to the speaker independent model (or to a cohort or background model) indicates a positive verification.

It is to be appreciated that the contemporaneous extraction of multiple attributes from an individual during a common recognition session can be performed by the aforementioned recognition systems or by other extraction means. It is to be further appreciated that the contemporaneous extraction of attributes from an individual can be performed at one location (i.e., where the individual is located) by separate recognition systems (or parts thereof) located remotely from the individual (and even each other). Thus, for example, in the case of extracting a password (an example of a non-biometric attribute) and a voice print (an example of a biometric attribute) from the individual, only a phone may be required at the location of the individual to contemporaneously extract those features, with further processing and recognition occurring remotely (at the location(s) of the recognition systems). The apparatus required at the location of the individual and the remotely located apparatus (e.g., the recognition systems or parts thereof) may be connected via, for example, a LAN (local area network), a phone line, or a transmission control protocol/internet protocol (TCP/IP) based WAN (wide area network) on the internet. Alternatively, the extraction and recognition functions can be performed by corresponding apparatus established at one location.

It is to be understood that the present invention is not limited to the contemporaneous extraction of attributes with respect to speaker recognition, lip reading and lip recognition techniques. Any two or more biometric attributes may be contemporaneously extracted to perform the identification. For example, when fingerprints are being collected with the use of a flat bed scanner, a hand geometry measurement can be done at the same moment. As a further example, credit card transactions typically require an individual's signature. However, such transactions may incorporate additional recognition techniques. For example, a credit card transaction may provide for the contemporaneous extraction of a signature, the pressure and velocity patterns of the pen used to generate the signature, as well as the hand geometry around the pen itself. In an apparatus implementing the aforementioned biometric recognition techniques, the individual may simply "point to" the location of corresponding previously stored biometric attributes via the apparatus and methods disclosed in the above-incorporated patent application (IBM Docket No. YO997-313) entitled "Apparatus and Methods for Providing Repetitive Enrollment in a Plurality of Biometric Recognition Systems Based on an Initial Enrollment". It is to be appreciated that additional biometric attributes, such as, iris recognition, face temperature infrared pattern or any combination thereof may be used. It is to be further appreciated that the above examples and list are not intended to be exhaustive, but rather illustrative, and other types of biometric attributes may be employed.

It is to be further understood, as stated above, that the present invention is not limited to synchronization of biometric techniques only, but rather, the present invention may be generalized to any combination of biometric techniques and/or non-biometric techniques wherein the biometric and/or non-biometric features of one technique are synchronized with another set of features contemporaneously obtained from the other technique. For example, a password spoken by a potential service/facility user may be decoded in order to confirm the accuracy of the password itself, contemporaneous with the performance of text-independent speaker recognition whereby the speaker is identified independent of the actual text being uttered. Similarly, recognition of a written password (another example of non-biometric indicia) as well as analysis of the pressure and velocity patterns of the pen used to write the password and the hand geometry around the pen itself may be used to authenticate the user. The recognition of the attributes in the previous example may be required in a transaction with, for example, an ATM, where the written password could represent the user's account number.

As illustrated in the examples above, numerous biometric and/or non-biometric attributes may be contemporaneously extracted from an individual. Accordingly, the present invention advantageously provides a reduction in the time required to perform recognition of an individual in a system implementing multiple recognition techniques. However, it is to be appreciated that a further reduction in that time may be achieved by contemporaneously performing the recognition functions (i.e., the processing of the extracted attributes for comparison with pre-stored attributes). Thus, in the above example, the written password, the velocity patterns of the pen, and the hand geometry may be contemporaneously extracted and processed. In that way, the overall time spent by the individual interacting with, and awaiting the results of, the multiple recognition systems is decreased to a minimum.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for recognizing an individual based on attributes associated with the individual, comprising the steps of:

pre-storing at least two distinctive attributes of the individual during at least one enrollment session;

contemporaneously extracting the at least two distinctive attributes from the individual during a common recognition session;

segmenting the pre-stored attributes and the extracted attributes according to a sequence of segmentation units;

indexing the segmented pre-stored and extracted attributes so that the segmented pre-stored and extracted attributes corresponding to an identical segmentation unit in the sequence of segmentation units are associated to an identical index; and respectively comparing the segmented pre-stored and extracted attributes associated to the identical index to each other to recognize the individual wherein at least one of the at least two distinctive attributes is lip shape and the comparing step is performed by a lip reading system and a lip recognition system.

2. The method of claim 1, wherein the at least two distinctive attributes are selected from one of biometric and non-biometric attributes.

3. The method of claim 1, wherein at least one of the at least two distinctive attributes is selected from one of face recognition, signature recognition, face temperature infrared pattern, hand geometry, writing instrument velocity, writing instrument pressure, fingerprint, retinal print, a password, a personal identification number (PIN), and personal information.

4. The method of claim 1, wherein the pre-storing step is performed by a server.

5. The method of claim 1, wherein one of the at least two distinctive attributes is voice print and the comparing step is performed by a speaker recognition system.

6. The method of claim 5, wherein the speaker recognition system is a text-dependent speaker recognition system.

7. The method of claim 5, wherein the speaker recognition system is a text-independent speaker recognition system.

8. The method of claim 7, further comprising a labeller for clustering lefemes having comparable lip positions.

9. The method of claim 8, wherein the lip reading system is a text-independent lip reading system.

10. The method of claim 9, wherein the lip reading system verifies if a lip shape extracted for a lefeme matches an expected lip shape of an associated cluster.

11. The method of claim 8, wherein the lip reading system is a text-dependent lip reading system.

12. The method of claim 11, wherein a lip shape corresponding to a lefeme is characterized by a deviation of the geometry relative to a corresponding speaker independent lip shape.

13. The method of claim 12, wherein a substantial match of a speaker dependent lip shape relative to the speaker independent lip shape indicates a positive verification of the individual.

14. The method of claim 1, wherein the comparing step includes comparing features of the lip shape selected from one of static features, dynamic features, and a combination of the aforementioned.

15. The method of claim 8, wherein two of the at least two attributes correspond to audio and video characteristics of the individual, the recognition of the individual depending on the individual correctly speaking a password phrase, the segmenting and indexing steps comprising the steps of:
(a) decoding synchronized utterances of audio and video data corresponding to the individual via application of a joint audio-video joint likelihood function to produce a decoded password phrase W, the joint likelihood function being a combination of likelihood functions for audio and video components;
(b) reducing an effect of the video component of the joint audio-video likelihood function;
(c) decoding the video data utilizing only the audio component of the joint likelihood function to produce a decoded password phrase V;
(d) adjusting the audio component of the joint likelihood function to produce a better match of the decoded password phrase V to the decoded password phrase W;
(e) decoding the synchronized utterances of audio and video data utilizing an iteratively updated joint audio-video likelihood function that includes the video component and the adjusted audio component to produce a new decoded password phrase W'; and
(f) iteratively repeating steps (b) through (e).

16. The method of claim 15, wherein the adjustment step further comprises the step of comparing the decoded password phrase V obtained via the joint audio-video likelihood function to the audio and video components from a previous iteration to produce a better match to the decoded password phrase W.

17. The method of claim 16, wherein the adjustment step further comprises the step of modifying some parameters of the video component of the joint likelihood function.

18. The method of claim 15, wherein the repeating step repeats steps (b) through (e) until a match between the decoded password phrase W' and the correct password phrase is established.

19. The method of claim 18, wherein if the match is a full match, then the individual is considered recognized.

20. The method of claim 18, wherein if the match is one of varying and degrading with each iteration, then the individual is considered to be an imposter.

21. The method of claim 18, wherein if the match is one of varying and degrading with each iteration, then the data are not properly indexed.

22. The method of claim 15, wherein the repeating step repeats steps (b) through (e) until the decoded password phrase W' does not change.

23. The method of claim 15, wherein the audio and video data are produced over small time segments.

24. The method of claim 15, wherein the video component corresponds to likelihood functions for lip contour geometry and mouth region.

25. The method of claim 8, wherein two of the at least two attributes correspond to audio and video characteristics of the individual, the recognition of the individual depending on the individual correctly speaking a password phrase, the segmenting and indexing steps comprising the steps of:
(a) decoding synchronized utterances of audio and video data corresponding to the individual via application of a joint audio-video joint likelihood function to produce a decoded password phrase W, the joint likelihood function being a combination of likelihood functions for audio and video components;
(b) reducing an effect of the audio component of the joint audio-video likelihood function;
(c) decoding the audio data utilizing only the video component of the joint likelihood function to produce a decoded password phrase A;
(d) adjusting the video component of the joint likelihood function to produce a better match of the decoded password phrase A to the decoded password phrase W;
(e) decoding the synchronized utterances of audio and video data utilizing an iteratively updated joint audio-video likelihood function that includes the audio component and the adjusted video component to produce a new decoded password phrase W'; and
(f) iteratively repeating steps (b) through (e).

26. The method of claim 8, wherein two of the at least two attributes correspond to audio and video characteristics of the individual, the recognition of the individual depending on the individual correctly speaking a password phrase, the segmenting and indexing steps comprising the steps of:
(a) decoding synchronized utterances of audio and video data corresponding to the individual via application of a joint audio-video joint likelihood function to produce a decoded password phrase W, the joint likelihood function being a combination of likelihood functions for audio and video components;

(b) reducing an effect of the video component of the joint audio-video likelihood function;

(c) decoding the video data utilizing only the audio component of the joint likelihood function to produce a decoded password phrase V;

(d) adjusting the audio component of the joint likelihood function to produce a better match of the decoded password phrase V to the decoded password phrase W;

(e) reducing an effect of the audio component of the joint audio-video likelihood function;

(f) decoding the audio data utilizing only the video component of the joint likelihood function to produce a decoded password phrase A;

(g) adjusting the video component of the joint likelihood function to produce a better match of the decoded password phrase A to the decoded password phrase W;

(h) decoding the synchronized utterances of audio and video data utilizing an iteratively updated joint audio-video likelihood function that includes the adjusted audio and video components to produce a new decoded password phrase W'; and (i) iteratively repeating steps (b) through (h).

27. The method of claim 26, wherein the repeating step repeats steps (b) through (h) until a match between the decoded password phrase W' and the correct password phrase is established.

28. The method of claim 26, wherein the repeating step repeats steps (b) through (h) until the decoded password phrase W' does not change.

29. A method for recognizing an individual based on attributes associated with the individual, comprising the steps of:

pre-storing at least two distinctive attributes of the individual during at least one enrollment session;

contemporaneously extracting the at least two distinctive attributes from the individual during a common recognition session;

segmenting the pre-stored attributes and the extracted attributes according to a sequence of segmentation units;

indexing the segmented pre-stored and extracted attributes so that the segmented pre-stored and extracted attributes corresponding to an identical segmentation unit in the sequence of segmentation units are associated to an identical index; and respectively comparing the segmented pre-stored and extracted attributes associated to the identical index to each other to recognize the individual wherein three of the at least two distinctive attributes are pen pressure, pen velocity, and hand geometry.

30. An apparatus for recognizing an individual based on attributes associated with the individual, comprising:

a store for pre-storing at least two distinctive attributes of the individual during at least one enrollment session;

contemporaneous extraction means for contemporaneously extracting the at least two distinctive attributes from the individual during a common recognition session;

segmentation means for segmenting the pre-stored attributes and the extracted attributes according to a sequence of segmentation units;

indexing means for indexing the segmented pre-stored and extracted attributes so that the segmented pre-stored and extracted attributes corresponding to an identical segmentation unit in the sequence of segmentation units are associated to an identical index; and comparing means for respectively comparing the segmented pre-stored and extracted attributes associated to the identical index to each other to recognize the individual, wherein at least one of the at least two distinctive attributes is lip shape and said comparing means comprises a lip reading system and a lip recognition system.

31. The apparatus of claim 30, wherein the at least two distinctive attributes are selected from one of biometric and non-biometric attributes.

32. The apparatus of claim 30, wherein at least one of the at least two distinctive attributes is selected from one of voice print, face recognition, signature recognition, face temperature infrared pattern, hand geometry, writing instrument velocity, writing instrument pressure, fingerprint, retinal print, a password, a personal identification number (PIN), and personal information.

33. The apparatus of claim 30, wherein two of the at least two attributes correspond to audio and video characteristics of the individual, the audio characteristics being text-independent, the recognition of the individual depending on the individual correctly speaking a password phrase, the segmenting and the indexing means further comprising:

(a) an audio and video joint likelihood function decoder for decoding synchronized utterances of audio and video data corresponding to the individual via application of a joint audio-video joint likelihood function to produce a decoded password phrase W, the joint likelihood function being a combination of likelihood functions for audio and video components;

(b) an audio likelihood function decoder operatively coupled to the audio and video joint likelihood function decoder for decoding the video data utilizing only the audio component of the joint likelihood function to produce a decoded password phrase V;

(c) a video likelihood function decoder operatively coupled to the audio and video joint likelihood function decoder for decoding the audio data utilizing only the video component of the joint likelihood function to produce a decoded password phrase A; and (d) an adjustment module operatively coupled to the audio and video joint likelihood function decoder, the audio likelihood function decoder and the video likelihood function decoder for adjusting the audio component of the joint likelihood function to produce a better match of the decoded password phrase V to the decoded password phrase W, and for adjusting the video component of the joint likelihood function to produce a better match of the decoded password phrase A to the decoded password phrase W.

34. An apparatus employing synchronized speaker recognition, lip reading and lip recognition for recognizing an individual, comprising:

a speaker recognition system for performing speaker recognition;

a lip reading system for performing lip reading;

a lip recognition system for performing lip recognition;

a camera and pointing system for generating images of the individual for use by the lip reading and lip recognition systems, the speaker recognition system, the lip reading system, the lip recognition system, and the camera and pointing system contemporaneously extracting biometric attributes corresponding to speaker recognition, lip reading and lip recognition;

a store operatively coupled to the speaker recognition system, the lip reading system, and the lip recognition system for pre-storing biometric attributes during at least one enrollment session, the pre-stored attributes respectively corresponding to speaker recognition, lip reading and lip recognition;

segmentation means for segmenting the pre-stored attributes and the extracted attributes according to a sequence of segmentation units;

indexing means for indexing the segmented pre-stored and extracted attributes so that the segmented pre-stored and extracted attributes corresponding to an identical segmentation unit in the sequence of segmentation units are associated to an identical index, the speaker recognition system, the lip reading system, and the lip recognition system respectively comparing the segmented pre-stored and extracted attributes associated to the identical index to each other to recognize the individual; and a controller for processing the results of the comparisons such that the individual is considered recognized if the segmented pre-stored attributes associated to the identical index substantially match the segmented extracted attributes associated to the identical index.

35. The apparatus of claim 34, wherein the lip reading system comprises a lip contour extractor and classifier for extracting and classifying the lip contour geometry of the individual.

36. The apparatus of claim 34, wherein the lip recognition system comprises a lip region classifier for classifying the lip shape of the individual.

37. The apparatus of claim 34, wherein the speaker recognition system is a textindependent speaker recognition system.

38. The apparatus of claim 37, further comprising a labeller for clustering lefemes having comparable lip positions.

39. The apparatus of claim 38, wherein the lip reading system is a textindependent lip reading system.

40. The apparatus of claim 39, wherein the lip reading comprises verifying if a lip shape extracted for a lefeme matches an expected lip shape of an associated cluster.

41. The apparatus of claim 34, wherein the lip reading system is a text-dependent lip reading system.

42. The apparatus of claim 41, wherein a lip shape corresponding to a lefeme is characterized by a deviation of the geometry relative to a corresponding speaker independent lip shape.

43. The apparatus of claim 42, wherein a close match of the speaker dependent shape relative to the speaker independent shape indicates a positive verification.

* * * * *